(12) United States Patent
Kim et al.

(10) Patent No.: US 11,648,756 B2
(45) Date of Patent: May 16, 2023

(54) PLASTIC INTERMEDIATE FILM, LAMINATE INCLUDING SAME, AND MOBILITY MEANS INCLUDING SAME

(71) Applicant: SKC Co., Ltd., Suwon-si (KR)

(72) Inventors: Hyejin Kim, Suwon-si (KR); Haksoo Lee, Suwon-si (KR)

(73) Assignee: SKC Co., Ltd., Suwon-si (KR)

( * ) Notice: Subject to any disclaimer, the term of this patent is extended or adjusted under 35 U.S.C. 154(b) by 0 days.

(21) Appl. No.: 17/580,099

(22) Filed: Jan. 20, 2022

(65) Prior Publication Data
US 2022/0143955 A1 May 12, 2022

Related U.S. Application Data

(63) Continuation of application No. PCT/KR2020/015615, filed on Nov. 9, 2020.

(30) Foreign Application Priority Data

Nov. 13, 2019 (KR) .......................... 10-2019-0144755

(51) Int. Cl.
*B32B 17/10* (2006.01)

(52) U.S. Cl.
CPC .. *B32B 17/10761* (2013.01); *B32B 17/10036* (2013.01); *B32B 17/10605* (2013.01); *B32B 17/10614* (2013.01); *B32B 2307/102* (2013.01); *B32B 2307/418* (2013.01); *B32B 2307/538* (2013.01); *B32B 2605/006* (2013.01)

(58) Field of Classification Search
CPC ....... B32B 3/263; B32B 17/06; B32B 27/306; B32B 2307/406; B32B 2307/412; B32B 2605/00; B32B 17/10; B32B 17/10587; B32B 17/10761; B32B 27/30; B32B 2605/08; G02B 1/111; G02B 5/208; B60J 1/00; B60J 1/001; C08J 5/18
USPC .......................... 428/156, 172, 212, 213, 214
See application file for complete search history.

(56) References Cited

U.S. PATENT DOCUMENTS

2012/0162752 A1 6/2012 Kitano et al.
2014/0364550 A1* 12/2014 Lu .......................... B32B 27/30
524/503

(Continued)

FOREIGN PATENT DOCUMENTS

| CN | 102317229 A | 1/2012 |
| CN | 106660867 A | 5/2017 |
| CN | 107207817 A | 9/2017 |

(Continued)

OTHER PUBLICATIONS

International Search Report for PCT/KR2020/015615.

*Primary Examiner* — Megha M Gaitonde
(74) *Attorney, Agent, or Firm* — NSIP Law

(57) ABSTRACT

The plastic intermediate film includes a sound insulating layer, wherein the sound insulating layer comprises a polyvinyl acetal resin, a plasticizer, and a refractive index regulator, wherein the refractive index regulator is particles with average diameter ($D_{50}$) of 100 nm or less and has an absolute refractive index of 2.0 or more, wherein the refractive index regulator is comprised in an amount of more than 0 wt % and 1 wt % or less based on the entire sound insulating layer, and wherein the plasticizer is comprised in an amount of 33 to 41 wt % based on the entire sound insulating layer.

11 Claims, 2 Drawing Sheets

(56) References Cited

U.S. PATENT DOCUMENTS

| | | | | |
|---|---|---|---|---|
| 2016/0082697 A1* | 3/2016 | Hara | .................. | C08J 7/044 |
| | | | | 428/212 |
| 2016/0159041 A1* | 6/2016 | Lu | ..................... | B60J 1/02 |
| | | | | 428/161 |

FOREIGN PATENT DOCUMENTS

| | | | |
|---|---|---|---|
| CN | 108885288 | A | 11/2018 |
| CN | 109313297 | A | 2/2019 |
| CN | 107000386 | B | 3/2020 |
| JP | 2007-070200 | A | 3/2007 |
| JP | 2012-101999 | A | 5/2012 |
| JP | 2017-223827 | A | 12/2017 |
| KR | 10-1354439 | B1 | 1/2014 |
| KR | 10-2017-0063431 | A | 6/2017 |
| KR | 10-2018-0061189 | A | 6/2018 |
| KR | 10-2005673 | B1 | 7/2019 |

* cited by examiner

PLASTIC INTERMEDIATE FILM, LAMINATE INCLUDING SAME, AND MOBILITY MEANS INCLUDING SAME

CROSS-REFERENCE TO RELATED APPLICATION

Pursuant to 35 USC 120 and 365(c), this application is a continuation of International Application No. PCT/KR2020/015615 filed on Nov. 9, 2020, and claims the benefit under 35 USC 119(a) of Korean Application No. 10-2019-0144755 filed on Nov. 13, 2019, in the Korean Intellectual Property Office, the entire disclosures of which are incorporated herein by reference for all purposes.

BACKGROUND

Polyvinyl acetal is being used as an intermediate film (film for laminated glass) of a laminated glass (safety glass) or a light transmitting laminate. Laminated glass is mainly used in windows of architecture, cladding, and window glass of automobiles, and due to characteristics such as anti-scattering of glass fragments when broken and penetration resistance against impact of a certain strength, it can secure stability for minimizing damage or injury given to objects or people located in the inside thereof.

Key functions of the laminated glass are preventing penetration through laminated glass (penetration resistance) and absorbing energy caused from impact to minimize damage or injury given to objects or people inside the transparent walls (impact resistance). In addition, an objective of laminated glass may be to have excellent optical properties applicable to clear glass for preventing a double image phenomenon or optical distortion, and also have robust environmental degradation resistant properties such as to moisture (optical properties and moisture resistance). Besides, an intermediate film applied to laminated glass may render an additional functionality including reducing sound noise and transmission of UV and/or IR rays to the laminated glass.

SUMMARY

In one general aspect, the plastic intermediate film includes: a sound insulating layer, wherein the sound insulating layer includes a polyvinyl acetal resin, a plasticizer, and a refractive index regulator, wherein the refractive index regulator is particles with average diameter ($D_{50}$) of 100 nm or less and has an absolute refractive index of 2.0 or more, wherein the refractive index regulator is comprised in an amount of more than 0 wt % and 1 wt % or less based on the entire sound insulating layer, and wherein the plasticizer is comprised in an amount of 33 to 41 wt % based on the entire sound insulating layer.

One surface of the sound insulating layer may have Sz value (surface roughness value) of 20 μm or less as surface roughness.

The plastic intermediate film may further include a first layer disposed on one surface of the sound insulating layer, wherein the plastic intermediate film has an Rsc value of 0 to 1 according to below Equation 1:

$$Rsc = 1-(\text{a refractive index of the first layer} - \text{a refractive index of the sound insulating layer})*100. \quad [\text{Equation 1}]$$

The plastic intermediate film may have an optical distortion index (A) of 30 μm or less expressed by below Equation 2:

$$A = Sz/Rsc \quad [\text{Equation 2}]$$

wherein, in the Equation 2, Sz is surface roughness (μm) of the one surface of the sound insulating layer, and Rsc is a value according to Equation 1.

The plastic intermediate film may have a haze value of 3% or less.

The plastic intermediate film may have an L/F (loss factor) of 0.34 or more.

The plastic intermediate film may have a long-term durability evaluation value (YH) of 1.2 or less according to below Equation 3:

$$YH = dY.I.*dH \quad [\text{Equation 3}]$$

wherein, in the Equation 3, YH is a long-term durability evaluation value, dY.I. is a value obtained by subtracting a yellow index value of the plastic intermediate film before an EMMAQUA test using an exposed energy of 500 K Langley from a yellow index value of the plastic intermediate film after passing the EMMAQUA test, and dH is a value obtained by subtracting a haze value of the plastic intermediate film before an EMMAQUA test using an exposed energy of 500 K Langley from a haze value of the plastic intermediate film after passing the EMMAQUA test.

The plastic intermediate film may have the dY.I. value of 3.5 or less.

The refractive index regulator may have a particle diameter difference between $D_{10}$ and $D_{90}$ within 1.5 times of $D_{50}$.

In another general aspect, the plastic intermediate film includes: a second layer comprising a polyvinyl acetal resin, a plasticizer, and a refractive index regulator; and a first layer disposed on a surface of the second layer, wherein the plastic intermediate film has a long-term durability evaluation value (YH) of 1.2 or less according to below Equation 3, wherein the refractive index regulator has an absolute refractive index of 2.0 or more and is comprised in an amount of more than 0 wt % and 1 wt % or less based on a total weight of the second layer, and wherein the plasticizer is comprised in an amount of 33 to 41 wt % based on the total weight of the second layer;

$$YH = dY.I.*dH \quad [\text{Equation 3}]$$

wherein, in the Equation 3, YH is a long-term durability evaluation value, dY.I. is a value obtained by subtracting a yellow index value of the plastic intermediate film before an EMMAQUA test using an exposed energy of 500 K Langley from a yellow index value of the plastic intermediate film after passing the EMMAQUA test, and dH is a value obtained by subtracting a haze value of the plastic intermediate film before an EMMAQUA test using an exposed energy of 500 K Langley from a haze value of the plastic intermediate film after passing the EMMAQUA test.

A difference of a refractive index of the first layer and a refractive index of the second layer may be 0 to 0.0068.

The haze value of the plastic intermediate film may be 3% or less.

The plastic intermediate film may have the dY.I. value of 3.5 or less.

An optical distortion index (A) of the plastic intermediate film may be 30 μm or less, where the optical distortion index (A) is expressed by below Equation 2:

$$A = Sz/Rsc \quad [\text{Equation 2}]$$

wherein, in the Equation 2, Sz is surface roughness (μm) of one surface of the second layer, and Rsc is a value obtained by Equation 1-1:

$$Rsc = 1-(\text{The refractive index of the first layer} - \text{The refractive index of the second layer})*100. \quad [\text{Equation 1}]$$

In still another general aspect, the laminate may include: a first light transmitting layer; the above plastic intermediate films disposed on the first light transmitting layer; and a second light transmitting layer disposed on the plastic intermediate film.

In still another general aspect, the mobility means may include the above laminate as a windshield.

Other features and aspects will be apparent from the following detailed description and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
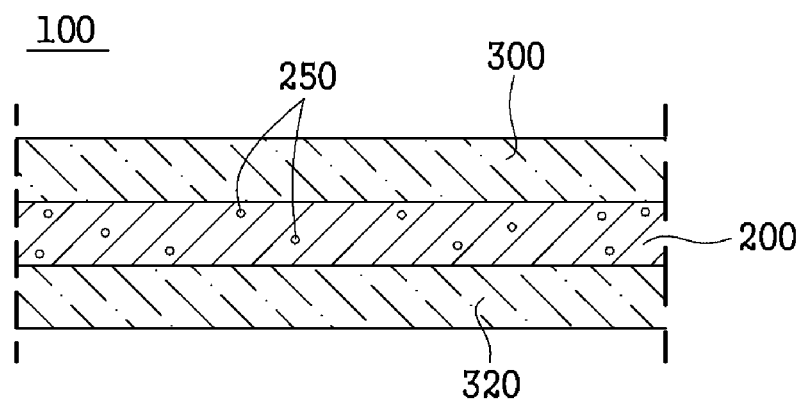
FIG. 1 is a conceptual view for illustrating the plastic intermediate film of one embodiment by using a section thereof.

Hereinafter, example embodiments of the present disclosure will be described in detail with reference to the accompanying drawings so that they can be easily practiced by those skilled in the art to which the embodiments pertain. However, the example embodiments may be embodied in many different forms and is not to be construed as being limited to the embodiments set forth herein. Like reference numerals designate like elements throughout the specification.

In this specification, the term for degree like "about", "substantially" and the like is used for meaning values approximative from/to the value when a tolerance to be proper to referred meaning for manufacture and substance is presented. Additionally, these terms for degree are used to help understanding of example embodiments and to prevent that an unconscionable trespasser unjustly uses the presented content in which exact or absolute number is referred.

Throughout this specification, the phrase "combination(s) thereof" included in a Markush-type expression denotes one or more mixtures or combinations selected from the group consisting of components stated in the Markush-type expression, that is, denotes one or more components selected from the group consisting of the components are included.

Throughout this specification, the description of "A and/or B" means "A, B, or A and B."

Throughout this specification, terms such as "first", "second", "A", or "B" are used to distinguish the same terms from each other unless specially stated otherwise.

In this specification, "B being placed on A" means that B is placed in direct contact with A or placed over A with another layer or structure interposed therebetween and thus should not be interpreted as being limited to B being placed in direct contact with A.

In this specification, a singular form is contextually interpreted as including a plural form as well as a singular form unless specially stated otherwise.

In this specification, a size of each component of a drawing can be exaggerated and different from a size to be actually applied.

In the present specification, the amount of a hydroxyl group was evaluated by measuring an amount of ethylene group combined with the hydroxyl group of the polyvinyl acetal resin by a method in accordance with JIS K6728.

An objective of the embodiment is providing a plastic intermediate film, a laminate including same, a mobility means including same, and the like.

The plastic intermediate film, the laminate including same, the mobility means including same, and the like of example embodiments can have a sound insulating characteristic and improved optical properties, durability, and the like.

Figure 2:
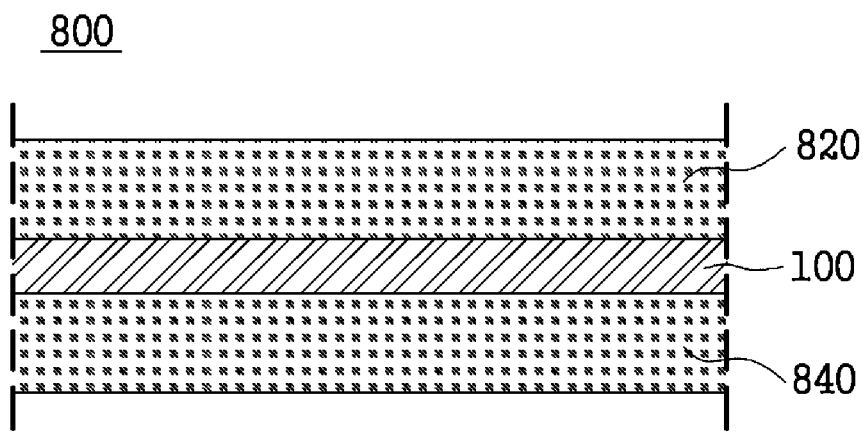
FIG. 2 is a conceptual view for illustrating the laminate of one embodiment by using a section thereof.
Figure 3:
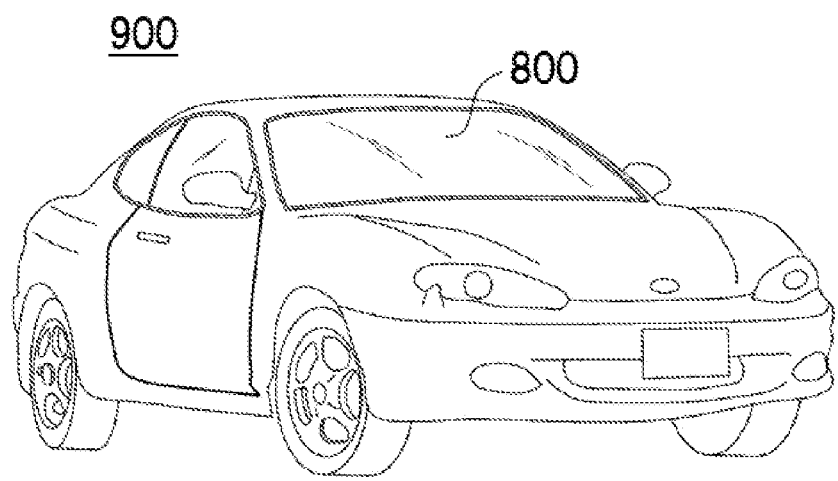
FIG. 3 is a conceptual view for illustrating the mobility means of one embodiment.

FIG. 1 is a conceptual view for illustrating the plastic intermediate film of one embodiment by using a section thereof, FIG. 2 is a conceptual view for illustrating the laminate of one embodiment by using a section thereof, and FIG. 3 is a conceptual view for illustrating the mobility means of one embodiment. Hereinafter, example embodiments will be described in further detail with reference to FIG. 1 to FIG. 3.

The plastic intermediate film 100 according to one embodiment includes a sound insulating layer 200, wherein the sound insulating layer 200 includes a polyvinyl acetal resin, a plasticizer, and a refractive index regulator 250, wherein the refractive index regulator 250 includes particles with average diameter ($D_{50}$) of 100 nm or less.

In many cases, a sound insulating layer of a plastic intermediate film includes more amount of a plasticizer than a layer not having a sound insulating functionality. Such sound insulating layer may easily form a melt fracture on the surface thereof in a process of manufacturing the intermediate film, and this may cause an optical distortion phenomenon like a dim image, which can be identifiable by naked eyes, by itself or in connection with a difference in refractive index between other layers disposed on the sound insulating layer. The inventors verified such a dim image phenomenon can be relieved by using a refractive index regulator 250 to the sound insulating layer 200.

The refractive index regulator 250 may include particles having a greater refractive index than a refractive index of the plasticizer. The refractive index regulator 250 is included in a plastic intermediate film and improves optical properties in addition to maximizing characteristic variations such as a sound insulating effect.

The refractive index regulator 250 may have a greater refractive index than the plasticizer.

The refractive index regulator 250 may have an average diameter ($D_{50}$) of 100 nm or less. The refractive index regulator 250 may have an average diameter ($D_{50}$) of 80 nm or less. The refractive index regulator 250 may have an average diameter ($D_{50}$) of 60 nm or less. The refractive index regulator 250 may have an average diameter ($D_{50}$) of 50 nm or less. The refractive index regulator 250 may have an average diameter ($D_{50}$) of 40 nm or less. The refractive index regulator 250 may have an average diameter ($D_{50}$) of 5 nm or more. When the refractive index regulator having such an average diameter is used, it is possible to relieve the occurrence of optical distortion phenomenon of the intermediate film substantially, in addition to minimizing degradation of other characteristics of the intermediate film.

The refractive index regulator 250 may have $D_{90}$ of 100 nm or less. The refractive index regulator 250 may have $D_{90}$ of 80 nm or less. The refractive index 250 regulator may have $D_{90}$ of 60 nm or less. The refractive index regulator 250 may have $D_{90}$ of 40 nm or less. The refractive index regulator 250 may have $D_{90}$ of 10 nm or more. When such a refractive index regulator is applied, it is possible to provide an intermediate film improved in all the optical properties and sound insulating characteristic.

The refractive index regulator 250 may satisfy a condition having the particle diameter difference between $D_{10}$ and $D_{90}$ within 1.5 times of $D_{50}$. The refractive index regulator 250 may satisfy a condition having the particle diameter difference between $D_{10}$ and $D_{90}$ within 1.2 times of $D_{50}$. When the refractive index regulator satisfying such a condition is used, it is possible to improve optical properties further due to a refractive index regulating effect while a sound insulating characteristic is substantially maintained.

The refractive index regulator 250 may have an absolute refractive index of 1.4 or more, or 1.5 or more. The refractive index regulator 250 may have an absolute refractive index of 2.0 or more. The refractive index regulator 250 may have an absolute refractive index of 3.0 or less. The refractive index regulator 250 may have an absolute refractive index of 2.4 or less. When a refractive index regulator having an absolute refractive index in such a range is included in the sound insulating layer, the refractive index of the sound insulating layer can be more effectively regulated.

As described in the above, the sound insulating layer 200 may have surface roughness on one surface thereof in a manufacturing process.

One surface of the sound insulating layer 200 may have Sz (surface roughness) value of 20 μm or less. One surface of the sound insulating layer 200 may have Sz value of 18 μm or less. One surface of the sound insulating layer 200 may have Sz value of more than 0 μm. One surface of the sound insulating layer 200 may have Sz value of more than 1 μm. When the surface roughness of one surface of the sound insulating layer has the above value, even if optical distortion phenomenon may occur, the occurrence of optical distortion phenomenon can be substantially prevented according to embodiments.

The surface roughness of one surface of the sound insulating layer may be measured by delaminating a first layer of one section of a sample by using hands, keeping it for one week in an oven at 50° C. and 20% RH (Relative Humidity) to shrink it naturally, and Sz value among roughness values of the surface can be measured using contour GT-X, which is noncontact type optical microscope.

The refractive index regulator 250 may be included in an amount of more than 0 wt % and 1 wt % or less based on a total weight of the sound insulating layer. The sound insulating layer may be included in an amount of 0.1 to 0.9 wt % based on a total weight of the sound insulating layer. When the refractive index regulator is included in such an amount range, it is possible to provide an intermediate film excellent in optical properties like a yellow index in addition to achieving a more stable effect of regulating a refractive index.

The sound insulating layer 200 may include a polyvinyl acetal resin and a plasticizer.

The polyvinyl acetal resin may be a polyvinyl acetal resin obtained by acetalization of a polyvinyl alcohol having a polymerization degree of 1,600 to 3,000 with aldehyde. The polyvinyl acetal resin may be a polyvinyl acetal resin obtained by acetalization of a polyvinyl alcohol having a polymerization degree of 1,700 to 2,500 with aldehyde. When such a polyvinyl acetal is used, mechanical properties like penetration resistance can be sufficiently improved.

The polyvinyl acetal resin may be synthesized from polyvinyl alcohol and aldehyde, and the aldehyde is not limited in the type. In detail, the aldehyde may be selected from the group consisting of n-butyl aldehyde, isobutyl aldehyde, n-valer aldehyde, 2-ethyl butyl aldehyde, n-hexyl aldehyde and blend resins thereof. When n-butyl aldehyde is used as the aldehyde, the produced polyvinyl acetal resin may have a characteristic in refractive index, where a difference of the refractive index of the produced polyvinyl acetal resin from a refractive index of a glass is small, and may have excellent adhesion with glass and the like.

The plasticizer may be selected from the group consisting of triethylene glycol bis 2-ethylhexanoate (3G8), tetraethylene glycol diheptanoate (4G7), triethylene glycol bis 2-ethylbutyrate (3GH), triethylene glycol bis 2-heptanoate (3G7), dibutoxyethoxyethyl adipate (DBEA), butyl carbitol adipate (DBEEA), dibutyl sebacate (DBS), bis 2-hexyl adipate (DHA) and combinations thereof. Specifically, any one selected from the group consisting of triethylene glycol di-2-ethyl butyrate, triethylene glycol di-2-ethylhexanoate, triethylene glycol di-n-heptanoate and combinations thereof may be included as the first plasticizer, and further specifically, triethylene glycol bis 2-ethylhexanoate (3G8) may be included.

The polyvinyl acetal resin included in the sound insulating layer 200 may have a butyral group in an amount of 60 mol % or more, or 60 to 72 mol %. The polyvinyl acetal resin may have a hydroxyl group in an amount of 20 mol % or less, 18 mol % or less, or more than 5 mol %. When a polyvinyl acetal resin having such a characteristic is included in the sound insulating layer, the sound insulating layer can have improved optical properties and give an excellent sound insulating characteristic to the intermediate film.

The sound insulating layer 200 may include a polyvinyl acetal resin in an amount of 58 to 66 wt %. The sound insulating layer 200 may include a polyvinyl acetal resin in an amount of 60 to 64 wt % based on a total weight of the sound insulating layer. When the polyvinyl acetal resin is included in such a range, it is possible to give a mechanical strength in a proper level and a comparatively excellent sound insulating characteristic at the same time to an intermediate film 100.

The sound insulating layer 200 may include a plasticizer in an amount of 33 to 41 wt %. The sound insulating layer 200 may include a plasticizer in an amount of 35 to 39 wt % based on a total weight of the sound insulating layer.

The plastic intermediate film 100 may further include a first layer 300 disposed on one surface of the sound insulating layer 200.

The plastic intermediate film 100 may further include a first layer 320 disposed on the other surface of the sound insulating layer 200.

The first layers 300 and 320 may include a first polyvinyl acetal resin and a first plasticizer, respectively, as described below.

The first polyvinyl acetal resin may include a butyral group in an amount of 50 mol % or more. The first polyvinyl acetal resin may include a butyral group in an amount of 50 to 60 mol %. The first polyvinyl acetal resin may include a hydroxyl group in an amount of 35 mol % or more. The first polyvinyl acetal resin may include a hydroxyl group in an amount of 40 mol % or more. The first polyvinyl acetal resin may include a hydroxyl group in an amount of less than 49.5 mol %. When the first polyvinyl acetal resin having such a characteristic is included in the first layer 300, the first layer can have proper mechanical properties while being bonded excellently to a material such as glass, and can have excellent sound insulating characteristic with a sound insulating layer.

The first polyvinyl acetal resin may be a polyvinyl acetal resin obtained by acetalization of a polyvinyl alcohol having a polymerization degree of 1,600 to 3,000 with aldehyde, or a polyvinyl acetal resin obtained by acetalization of a polyvinyl alcohol having a polymerization degree of 1,700 to 2,500 with aldehyde. When such a polyvinyl acetal is used, mechanical properties like penetration resistance can be sufficiently improved.

The first polyvinyl acetal resin may be synthesized from polyvinyl alcohol and aldehyde, and the aldehyde is not limited in type. In detail, the aldehyde may be selected from the group consisting of n-butyl aldehyde, isobutyl aldehyde, n-valer aldehyde, 2-ethyl butyl aldehyde, n-hexyl aldehyde and blend resins thereof. When n-butyl aldehyde is used as the aldehyde, the produced polyvinyl acetal resin may have a characteristic, where a difference of the refractive index of the produced polyvinyl acetal resin from a refractive index of a glass is small, and may have excellent adhesion with glass and the like.

The first plasticizer may be selected from the group consisting of triethylene glycol bis 2-ethylhexanoate (3G8), tetraethylene glycol diheptanoate (4G7), triethylene glycol bis 2-ethylbutyrate (3GH), triethylene glycol bis 2-heptanoate (3G7), dibutoxyethoxyethyl adipate (DBEA), butyl carbitol adipate (DBEEA), dibutyl sebacate (DBS), bis 2-hexyl adipate (DHA) and combinations thereof. Specifically, any one selected from the group consisting of triethylene glycol di-2-ethyl butyrate, triethylene glycol di-2-ethylhexanoate, triethylene glycol di-n-heptanoate and combinations thereof may be included as the first plasticizer, and further specifically, triethylene glycol bis 2-ethylhexanoate (3G8) may be included.

The first layer 300 may include the first polyvinyl acetal resin in an amount of 60 to 76 wt %. The first layer 300 may include the first polyvinyl acetal resin in an amount of 70 to 76 wt %. The first layer 300 may include the first polyvinyl acetal resin in an amount of 71 to 74 wt %. When including the polyvinyl acetal resin in such a range, the intermediate film 100 can achieve comparatively excellent mechanical properties.

The first layer 300 may include the first plasticizer in an amount of 24 to 40 wt %. The first layer 300 may include the first plasticizer in an amount of 24 to 30 wt %. The first layer 300 may include the first plasticizer in an amount of 26 to 29 wt %. When the first layer includes the plasticizer in such a range, it is preferable in that a plastic intermediate film can achieve a proper adhesion strength and impact resistance.

The first polyvinyl acetal resin and a second polyvinyl acetal resin, which is a polyvinyl acetal resin included in the sound insulating layer, have a difference in the amount of hydroxyl group of 20 mol % or more. The difference in the amount of hydroxyl group may be 24 mol % or more. The difference in the amount of hydroxyl group may be 26 mol % or more. Also, the difference in the amount of hydroxyl group may be 32 mol % or less. When the first polyvinyl acetal resin and the second polyvinyl acetal resin are respectively included in the first layer 300 and the sound insulating layer 200 to have such a difference in the amount of hydroxyl group, the intermediate film 100 is excellent in a sound insulating characteristic and moisture resistance, while not substantially generating a migration phenomenon of a plasticizer.

The first layers 300 and 320 and/or a sound insulating layer 200 may further include an additive as described below. The additive may be selected from the group consisting of a heat stabilizer (may be limited to the first layer), a UV absorber, a UV stabilizer, an IR absorber, a glass adhesion regulator, and combinations thereof.

As the heat stabilizer, a phosphite-based heat stabilizer may be used. For example, the heat stabilizer may be IRGAFOS 168 available from BASF SE, but is not limited thereto.

As the UV absorber, Chemisorb 12, Chemisorb 79, Chemisorb 74 or Chemisorb 102 available from CHEMIPRO KASEI KAISHA, LTD may be used, or Tinuvin 328, Tinuvin 329 or Tinuvin 326 available from BASF SE may be used. As the UV stabilizer, Tinuvin available from BASF SE may be used. As the IR absorber, ITO, ATO or AZO may be used, and as the glass adhesion regulator, a metal salt such as magnesium (Mg), potassium (K), sodium (Na), epoxy-based modified silicon (Si) oil or a mixture thereof may be used, but the present disclosure is not limited thereto.

As the IR absorber, ITO, ATO, or AZO may be used, and as the glass adhesion regulator included in the first layer, a metal salt such as magnesium (Mg), potassium (K), sodium (Na), epoxy-based modified silicon (Si) oil, or a mixture thereof may be used, but the present disclosure is not limited thereto.

The intermediate film 100 may include the first layer 300 and the sound insulating layer 200, and may include the sound insulating layer 200 disposed between two first layers 300 and 320.

The intermediate film 100 may have a structure of three-layered, or may have a structure of four-layered or five-layered further including an additional functional layer (ex: hud, colored, shade band, blocking/reflecting IR or the like).

The intermediate film 100 may have a total thickness of 400 μm or more. The intermediate film 100 may have a total thickness of 400 to 1600 μm. The intermediate film 100 may have a total thickness of 500 to 1200 μm. The intermediate film 100 may have a total thickness of or 600 to 900 μm. The intermediate film can be more improved in the mechanical strength, sound insulating characteristic and the like as being thicker in the thickness, because it is used for manufacturing a light transmitting laminate such as laminated glass. However, when considering minimal legally required performance, cost, weight reduction and the like, the above thickness range enables the manufacture of a film satisfying various conditions.

The first layers 300 and 320 may have a thickness of 20 to 600 μm, respectively. The first layers 300 and 320 may have a thickness of 200 to 400 μm, respectively.

The sound insulating layer 200 may have a thickness of 60 to 600 μm. The sound insulating layer 200 may have a thickness of 70 to 300 μm. The sound insulating layer 200 may have a thickness of 70 to 200 μm.

An intermediate film including respective layers having such a thickness range can provide a light transmitting laminate having excellent optical properties and sound insulating characteristic in addition to proper mechanical properties.

The plastic intermediate film 100 may have an Rsc value of 0 to 1 according to below Equation 1:

$$Rsc = 1 - (\text{The refractive index of the first layer} - \text{The refractive index of the sound insulating layer}) * 100.$$ [Equation 1]

The plastic intermediate film 100 may have an optical distortion index (A) of 30 μm or less, or 20 μm or less expressed by below Equation 2. The optical distortion index (A) may be 0.3 μm or more. The optical distortion index (A) may be 5 μm or more:

$$A = Sz/Rsc$$ [Equation 2]

In the Equation 2, Sz is surface roughness (μm) of one surface of the sound insulating layer, and Rsc is the value obtained from Equation 1.

A plastic intermediate film having such a characteristic can have a characteristic of not generating optical distortion substantially, and have excellent optical properties.

The plastic intermediate film 100 may have a haze value of 3% or less. The plastic intermediate film 100 may have a haze value of 2% or less. The plastic intermediate film 100 may have a haze value of 1.5% or less.

The plastic intermediate film 100 may have an L/F (loss factor at 20° C.) value of 0.34 or more.

The plastic intermediate film 100 may have a visible light transmittance of 85% or more.

The plastic intermediate film 100 may have a difference in yellow index of 3.5 or less between before and after an EMMAQUA test applying an exposed energy in an amount of about 500 K Langley.

The plastic intermediate film 100 may have a difference in yellow index of 3.5 or less between before and after an EMMAQUA test applying an exposed energy in an amount of about 750 K Langley.

The plastic intermediate film 100 may have a long-term durability evaluation value (YH) of 1.2 or less according to below Equation 3:

$$YH=dY.I.*dH \quad \text{[Equation 3]}$$

In the Equation 3, YH is a long-term durability evaluation value, dY.I. is a difference in yellow index value of before and after an EMMAQUA test applying an exposed energy of about 500 K Langley, and dH is a difference in haze value before and after an EMMAQUA test applying an exposed energy of about 500 K Langley.

The testing standard of the YH is ASTM G90 Cycle 3, and the YH is a calculated value obtained by performing disclosure of an exposed energy (Night Time Wetting) of total 500 K Langley and measuring below two values:

$dY.I.$ (difference of Y.I.)=$Y.I.$ after EMMAQUA test−$Y.I.$ before EMMAQUA test $dH$ (difference of Haze)=$Hz$ after EMMAQUA test−$Hz$ before EMMAQUA test The dY.I. and dH are respectively measured by using three or more samples and the average value thereof is applied.

The plastic intermediate film 100 may have a long-term durability evaluation value (YH) of 0.82 or less according to below Equation 3. The plastic intermediate film 100 may have a long-term durability evaluation value (YH) of 0.50 or less according to below Equation 3. The plastic intermediate film 100 may have a long-term durability evaluation value (YH) of 0.30 or less, or more than 0 according to below Equation 3. The plastic intermediate film 100 having such a characteristic may have excellent optical properties maintained during relatively long term.

The plastic intermediate film 100 according to another embodiment further includes a second layer 200 including a polyvinyl acetal resin and a plasticizer, and a first layer 300 disposed on one surface of the second layer, and has a long-term durability evaluation test value (YH) of 1.2 or less according to below Equation 3:

$$YH=dY.I.*dH \quad \text{[Equation 3]}$$

In the Equation 3, YH is a long-term durability evaluation test value, dY.I. is a difference in yellow index value of before and after an EMMAQUA test applying an exposed energy of about 500 K Langley, and dH is a difference in haze value before and after an EMMAQUA test applying an exposed energy of about 500 K Langley.

The first layer 300 and the second layer 200 may have a difference in refractive index of 0 to 0.0068. The difference in refractive index refers to the difference of a refractive index of the first layer and a refractive index of the second layer, and expressed by the absolute value. For example, the difference in refractive index may be a value of subtracting the refractive index of the second layer from the refractive index of the first layer.

The plastic intermediate film 100 may have an optical distortion index (A) of 30 μm or less. The plastic intermediate film 100 may have an optical distortion index (A) of 20 μm or less. The optical distortion index (A) may be 0.3 μm or more. The optical distortion index (A) may be 5 μm or more:

$$A=Sz/Rsc \quad \text{[Equation 2]}$$

In the Equation 2, Sz is surface roughness (μm) of one surface of the second layer, and Rsc is a value according to below Equation 1-1:

$$Rsc=1-(\text{The refractive index of the first layer}-\text{The refractive index of the second layer})*100 \quad \text{[Equation 1-1]}$$

A description of the second layer is overlapped with the above description of the sound insulating layer, and thus the further detailed description is omitted.

The description of the first layer and the description of the plastic intermediate film are overlapped with the above description, and thus the further detailed description is omitted.

The light transmitting laminate 800 according to another embodiment includes: a first light transmitting layer 820; a plastic intermediate film 100 described above disposed on one surface of the first light transmitting layer; and a second light transmitting layer 840 disposed on the plastic intermediate film.

The first light transmitting layer 820 and the second light transmitting layer 840 may be a light transmitting glass or a light transmitting plastic, respectively.

A detailed description of the plastic intermediate film 100 is overlapped with the above description, and thus the further description is omitted.

The light transmitting laminate 800 may allow light transmitting layers of both sides to be bonded by the plastic intermediate film 100 and can have characteristics required in safety glass and the like, such as impact resistance and penetration resistance, while maintaining a light transmitting characteristic, which the first light transmitting layer 820 and the second light transmitting layer 840 have, to be almost the same level.

The light transmitting laminate 800 may satisfy an impact resistance characteristic in accordance with KS L 2007: 2008.

The light transmitting laminate 800 may satisfy a penetration resistance characteristic in accordance with KS L 2007.

The light transmitting laminate 800 has excellent functionality when applied as a glass of an automobile (including a windshield), a material of architecture and the like. Particularly, when applied as front glass of an automobile, the plastic intermediate film 100 and the light transmitting laminate 800 including the same, that have a relatively thin thickness and are equipped in all of the impact resistance, sound insulating characteristic, double image preventing functionality, can be provided.

The mobility means 900 according to another embodiment includes a light transmitting laminate 800 described above as a windshield.

The mobility means 900 may be applied to any mobility means including a windshield, and a representative example of the mobility means may be an automobile, and the body part, the driver part, the driving wheel, the connector and the like may be applied without limitation, if the component is ordinarily included in an automobile.

The mobility means 900 includes a body part forming a main body of the mobility means, a driver part (engine, etc.) attached to the body, a drive wheel attached to be rotatable to the body, a connector connecting the drive wheel and the driver part; and a windshield attached to a part of the body part, which is a light transmitting laminate for blocking wind from outside.

Hereinafter, the embodiments will be described in more detail with reference to the specific examples. However, the below examples are only just examples to aid understanding of the embodiments, and the scope of the present disclosure is not limited thereto.

index of 2.41) are respectively prepared as refractive index regulators. The absolute refractive indices of respective refractive index regulators are presented in below Table 1. $ZrO_2$ as the refractive index regulator has $D_{50}$ in a range of 22 to 32 nm and $D_{90}$ in a range of 60 nm or less in all cases. Also, one satisfying the condition of the difference between $D_{10}$ and $D_{90}$ within 1.5 times of $D_{50}$ was applied as the $ZrO_2$.

Manufacture of Plastic Intermediate Film

A mixture with the same composition as below Table 1 as the first layer was put into a twin-screw extruder a to be extruded, and a composition corresponding to below each Example as the second layer or the sound insulating layer, was put into a twin-screw extruder b, divided into three layers of a/b/a structure through a feed block, and stretched to be a sheet form through a t-die, thereby manufacturing the plastic intermediate film sample. At this time, the temperature of a lip-cooler of a die was maintained to be the same in all the samples except for Example 4. Example 4 was manufactured to form a larger value of surface roughness by adjusting the temperature of a lip-cooler. Plastic intermediate films were manufactured to have a total thickness of 780 μm, respectively.

TABLE 1

| Manufacturing Example | Composition of First Layer (Parts by Weight) | | | Refractive Index of First Layer | Composition of Second Layer/Sound Insulating Layer (Parts by Weight) | | | | Refractive Index of Second Layer/Sound Insulating Layer |
|---|---|---|---|---|---|---|---|---|---|
| | PVB_A Resin | 3G8 as Plasticizer | Additive for First Layer | | PVB_B Resin | 3G8 as Plasticizer | Type of Refractive Index Regulator | Added Amount (Parts by Weight) | |
| 1 | 72.58 | 27 | 0.45 | 1.4842 | 63 | 37 | — | — | 1.4766 |
| 2 | 72.58 | 27 | 0.45 | 1.4842 | 70 | 30 | — | — | 1.4802 |
| 3 | 72.58 | 27 | 0.45 | 1.4842 | 62.4 | 37 | $ZrO_2$ | 0.6 | 1.4809 |
| 4 | 72.58 | 27 | 0.45 | 1.4842 | 62.4 | 37 | $ZrO_2$ | 0.6 | 1.4809 |
| 5 | 72.58 | 27 | 0.45 | 1.4842 | 61.93 | 37 | $ZrO_2$ | 1.07 | 1.4842 |
| 6 | 72.58 | 27 | 0.45 | 1.4842 | 61.9 | 37 | $ZrO_2$ | 0.1 | 1.4773 |
| 7 | 72.58 | 27 | 0.45 | 1.4842 | 60.7 | 37 | $ZnCl_2$ | 2.3 | 1.4808 |
| 8 | 72.58 | 27 | 0.45 | 1.4842 | 62.5 | 37 | $BaTiO_3$ | 0.5 | 1.4811 |

Manufacture of Resin and Additive

Manufacturing Method of Polyvinyl Butyral Resin (PVB A):

A polyvinyl alcohol resin having an average polymerization degree of 1700 and a saponification degree of 99 was synthesized with n-butyl aldehyde, and thereby a polyvinyl butyral resin (A) having a butyral group of 56.2 mol % and a hydroxyl group of 42.9 mol % was obtained.

Manufacturing Method of Polyvinyl Butyral Resin (PVB B):

A polyvinyl alcohol resin having an average polymerization degree of 2400 and a saponification degree of 88 was synthesized with n-butyl aldehyde, and thereby a polyvinyl butyral resin (B) having a butyral group of 68.0 mol % and a hydroxyl group of 16.5 mol % was obtained.

Manufacture of Additive for First Layer:

Tinuvin-328 as a UV additive of 0.3 parts by weight, a mixture of Irganox 1010 and Irgafos 168 with a ratio of 1:1 as an antioxidant of 0.1 parts by weight, a mixture of MgAc (Magnesium Acetate) of 0.03 parts by weight and KAc (Potassium Acetate) of 0.02 parts by weight as an adhesion regulator were mixed and an additive for a first layer of 0.45 parts by weight was manufactured.

Preparation of Refractive Index Regulator:

$ZrO_2$ (absolute refractive index of 2.21), $ZnCl_2$ (absolute refractive index of 1.68) and $BaTiO_3$ (absolute refractive Evaluation of Properties (1) Evaluation of Surface Roughness The first layer of one section of the plastic intermediate film sample manufactured to have three layers was delaminated by a hand, and kept for one week in an oven at 50° C. and 20% RH (Relative Humidity) to shrink naturally. Subsequently, contour GT-X available from BRUKER, which is a noncontact type optical microscope, was used to measure Sz value among surface roughness values. Sz is a value defined according to ISO 25178-2:2012. Sz is the maximum height and is the sum of maximum peak height (Sp) and maximum pit height (Sv).

(2) Evaluation of Optical Distortion (Manufacture and Evaluation of Sample for DISTORTION Test)

The manufactured intermediate films were respectively cut into a size of 10 cm in length and breadth, interposed between two pieces of clear glass (10 cm in length, 10 cm in breadth, and 2.1 mm in thickness), and treated by vacuum lamination for 30 seconds in a laminator at 110° C. and 1 atmospheric pressure for pre-pressurizing laminate glass. Thereafter, the pre-pressurized laminated glass was pressurized for 20 minutes under the condition of a temperature of 140° C. and a pressure of 1.2 MPa in an autoclave, thereby obtaining the laminated glass.

The obtained sample was erected with an interval of 10 cm from a wall, subsequently lighted by an LED light in an angle of 20 degrees and a distance of 30 cm, and checked whether optical distortion was observed in a shadow on the wall.

(3) Measuring Method of Sound Insulating Performance (L/F)

The respective intermediate films were cut into a size of 30 cm in length and 2.5 cm in breadth, interposed between two pieces of clear glass (30 cm in length, 2.5 cm in breadth, and 2.1 mm in thickness), and treated by vacuum lamination for 30 seconds in a laminator at 110° C. and 1 atmospheric pressure for pre-pressurizing laminated glass. Subsequently, the pre-pressurized laminated glass was pressurized for 20 minutes under the condition of a temperature of 140° C. and a pressure of 1.2 MPa in an autoclave, thereby obtaining the laminated glass sample used for measurement of sound insulating performance.

The laminated glass sample was kept for two weeks in a constant temperature and humidity chamber at 20° C. and 20 RH % to be stabilized, and after that sound insulating performance was measured.

The measurement of sound insulating performance was performed as follows.

Vibration was added to the laminated glass by a vibration generator for DAMP test, the vibration characteristics obtained from the above method was amplified by a mechanical impedance measuring device, the vibration spectrum was analyzed by FET spectrum analyzer to be calculated by 1 dB method, and thereby an L/F (loss factor) value was obtained.

When sound insulating performance is 0.34 or more, it was expressed as PASS, and when sound insulating performance is less than 0.34, it was expressed as FAIL in Table 2 below.

(5) Measurement of Haze and Y.I.

Haze was measured by using NDH 5000W model available from NIPPON DENSHOKU according to JIS K 7105 standard.

Y.I. was measured in accordance with ASTM E313. In detail, a sample was prepared by laminating a laminated structure of release film-sheet-release film (silicon coated PET) in a laminator at a temperature of 150° C. for 15 minutes through heating and pressurizing. Thereafter, the sample was measured by using a measuring device available from HUNTERLAB under the condition of 400 to 800 nm after release films were removed from the sample, and when Y.I is 3.0 or less, it was evaluated as PASS, and when Y.I. is more than 3.0, it was evaluated as FAIL and the result was shown in Table 2 below.

(6) Evaluation of Long-Term Durability

Three identical samples were prepared per each Example by a method of manufacturing a laminated glass, which includes interposing an intermediate film between two pieces of glass in a size of 6*15 cm and a thickness of 2.1 T (T=mm), pre-laminating and main laminating.

The manufactured sample was tested by EMMAQUA test, which is exposure testing in a harsh condition in Arizona.

Testing standard was ASTM G90 Cycle 3, and the following two values were measured after exposure of total 500 K Langley (Night Time Wetting):

$dY.I.$ (difference of $Y.I.$)=$Y.I$ after EMMAQUA test– $Y.I$ before EMMAQUA test $dH$ (difference of Haze)=$Hz$ after EMMAQUA test– $Hz$ before EMMAQUA test The dY.I. and dH were measured with respective three or more samples and the average value was applied. Also, a value of multiplying the dY.I. and dH was evaluated as long-term durability (YH) and shown in Table 2.

TABLE 2

| Manufacturing Example | Difference in Refractive Index* | Sz (μm) | Distortion | A (μm)* | Sound Insulating Performance | Haze (%) | Y.I. | EMMAQUA* Testing Result | YH |
|---|---|---|---|---|---|---|---|---|---|
| 1 | 0.0077 | 12 | Fail | 52.17 | Pass | 1.04 | Pass | n/a | — |
| 2 | 0.0007 | 12 | Pass | 12.90 | Fail | 1.00 | Pass | n/a | — |
| 3 | 0.0034 | 12 | Pass | 18.18 | Pass | 1.15 | Pass | Pass | 0.25 |
| 4 | 0.0034 | 25 | Fail | 37.88 | Pass | 1.13 | Pass | Pass | 0.24 |
| 5 | 0 | 12 | Pass | 12.00 | Pass | 2 | Fail | Pass | 0.36 |
| 6 | 0.0069 | 12 | Fail | 38.71 | Pass | 1.04 | Pass | Pass | 0.16 |
| 7 | 0.0034 | 12 | Pass | 18.18 | Pass | 6.8 | Fail | Fail | 1.52 |
| 8 | 0.0031 | 12 | Pass | 17.39 | Pass | 4.4 | Fail | n/a | — |

*Difference in Refractive Index is a value of subtracting a refractive index of a second layer or a sound insulating layer from a refractive index of a first layer.
*A is an optical distortion index, and a value evaluated by Equation 2: [Equation 2] A = Sz/Rsc
In the Equation 2, Sz is surface roughness (μm) of one surface of a sound insulating layer, and Rsc is a value according to Equation 1 or Equation 1-1.
[Equation 1] Rsc = 1 − (The refractive index of the first layer − The refractive index of the sound insulating layer)*100
[Equation 1-1] Rsc = 1 − (The refractive index of the first layer − The refractive index of the second layer)*100
*YH is dY.I. * dH, and respective values were evaluated by below Equations.
dY.I. (difference of Y.I.) = Y.I. after EMMAQUA test − Y.I. before EMMAQUA test
dH (difference of Haze) = Hz after EMMAQUA test − Hz before EMMAQUA test (4) Measuring Method of Refractive Index of Film The refractive index of the manufactured film was measured at offset mode by using a prism coupler (model 2010M) available from METRICON located in US. All the measured values were measured by relative refractive index at 24° C. and a wavelength of 532 nm as the same from one another and shown in Table 1 above.

With reference to the compositions and the result of property measurement of Manufacturing Example 1 and Manufacturing Example 2, when the amount of a plasticizer was increased in a second layer or a sound insulating layer for obtaining sound insulating performance, optical distortion phenomenon could occur depending on surface roughness. This was thought to occur due to a difference of surface roughness and a refractive index of one surface of the second layer (or the sound insulating layer), and it was also identified as a value evaluated by optical distortion testing index.

Sound insulating performance was evaluated to be above reference value in all cases when the amount of the plasticizer was sufficient enough. However, haze and yellow index (Y.I.) as optical properties had different result depending on the type and the amount of the refractive index regulator. Particularly, when $ZnCl_2$ and $BaTiO_3$ were applied, haze was shown to be high. This could mean that improvement may be necessary by a method of increasing compatibility of the refractive index regulator with a resin and/or a plasticizer by utilizing a dispersion agent or the like.

As shown in Manufacturing Examples 3 to 6, the result of evaluating long-term durability considering haze and yellow index confirmed that Manufacturing Examples using zirconia as a refractive index regulator showed comparatively great result.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A plastic intermediate film comprising:
   a sound insulating layer,
   wherein the sound insulating layer comprises a polyvinyl acetal resin, a plasticizer, and a refractive index regulator,
   wherein the refractive index regulator is particles with average diameter ($D_{50}$) of 100 nm or less and has an absolute refractive index of 2.0 or more,
   wherein the refractive index regulator is comprised in an amount of more than 0 wt % and 1 wt % or less based on the entire sound insulating layer, and
   wherein the plasticizer is comprised in an amount of 33 to 41 wt % based on the entire sound insulating layer.

2. The plastic intermediate film of claim 1,
   wherein one surface of the sound insulating layer has Sz value (surface roughness value) of 20 μm or less as surface roughness.

3. The plastic intermediate film of claim 1, further comprising a first layer disposed on one surface of the sound insulating layer,
   wherein the plastic intermediate film has an Rsc value of 0 to 1 according to below Equation 1:
   $$Rsc=1-(\text{a refractive index of the first layer}-\text{a refractive index of the sound insulating layer})*100. \quad [\text{Equation 1}]$$

4. The plastic intermediate film of claim 3, having an optical distortion index (A) of 30 μm or less expressed by below Equation 2:
   $$A=Sz/Rsc \quad [\text{Equation 2}]$$
   wherein, in the Equation 2, Sz is surface roughness (μm) of the one surface of the sound insulating layer, and Rsc is a value according to Equation 1.

5. The plastic intermediate film of claim 1, having a haze value of 3% or less.

6. The plastic intermediate film of claim 1, having an L/F (loss factor) of 0.34 or more.

7. The plastic intermediate film of claim 1, having a long-term durability evaluation value (YH) of 1.2 or less according to below Equation 3:
   $$YH=dY.I.*dH \quad [\text{Equation 3}]$$
   wherein, in the Equation 3, YH is a long-term durability evaluation value, dY.I. is a value obtained by subtracting a yellow index value of the plastic intermediate film before an EMMAQUA test using an exposed energy of 500 K Langley from a yellow index value of the plastic intermediate film after passing the EMMAQUA test, and dH is a value obtained by subtracting a haze value of the plastic intermediate film before an EMMAQUA test using an exposed energy of 500 K Langley from a haze value of the plastic intermediate film after passing the EMMAQUA test.

8. The plastic intermediate film of claim 1, wherein the dY.I. value of the plastic intermediate film is 3.5 or less.

9. The plastic intermediate film of claim 1, wherein the refractive index regulator has a particle diameter difference between $D_{10}$ and $D_{90}$ within 1.5 times of $D_{50}$.

10. A laminate comprising:
    a first light transmitting layer;
    the plastic intermediate film of claim 1 disposed on the first light transmitting layer; and
    a second light transmitting layer disposed on the plastic intermediate film.

11. A mobility means, comprising the laminate according to claim 10 as a windshield.

* * * * *